July 30, 1940. A. E. LONG 2,209,409
TIME RECORDER
Filed July 12, 1934 10 Sheets-Sheet 1
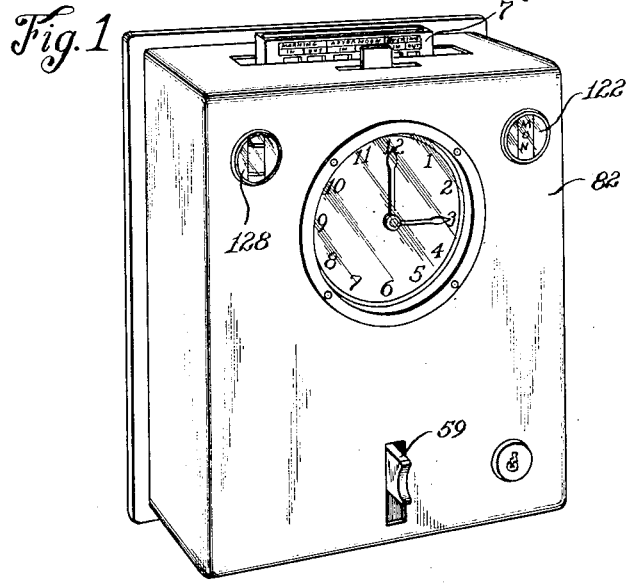
Fig. 1
Fig. 2
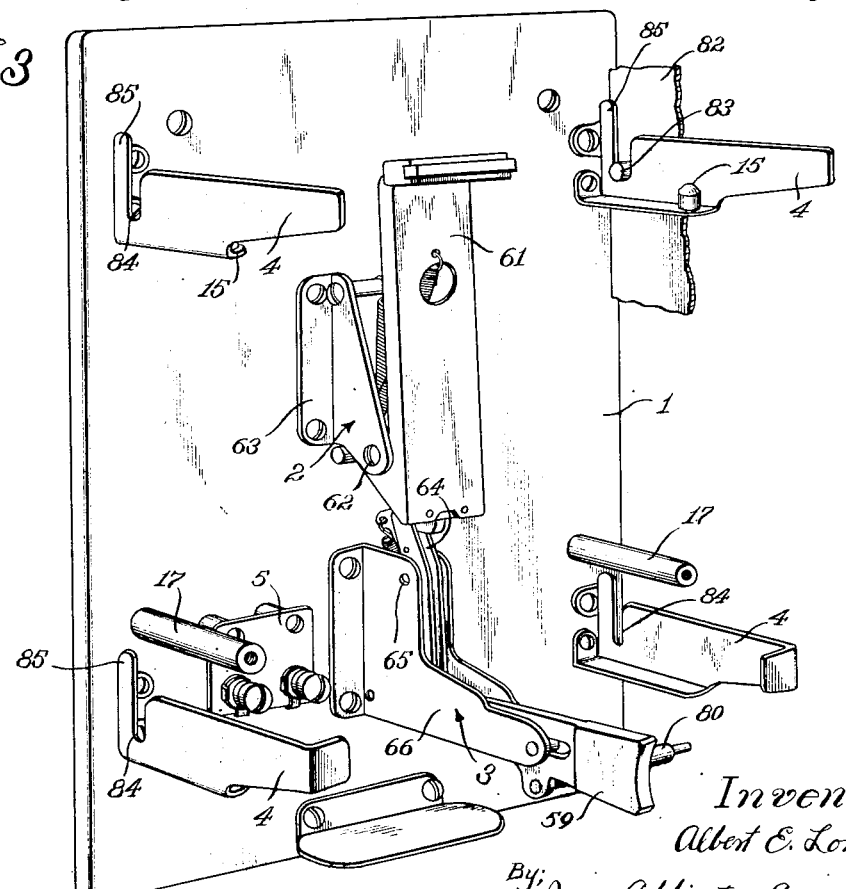
Fig. 3
Inventor;
Albert E. Long,
By; Jones, Addington, Ames + Seibold,
Attys.

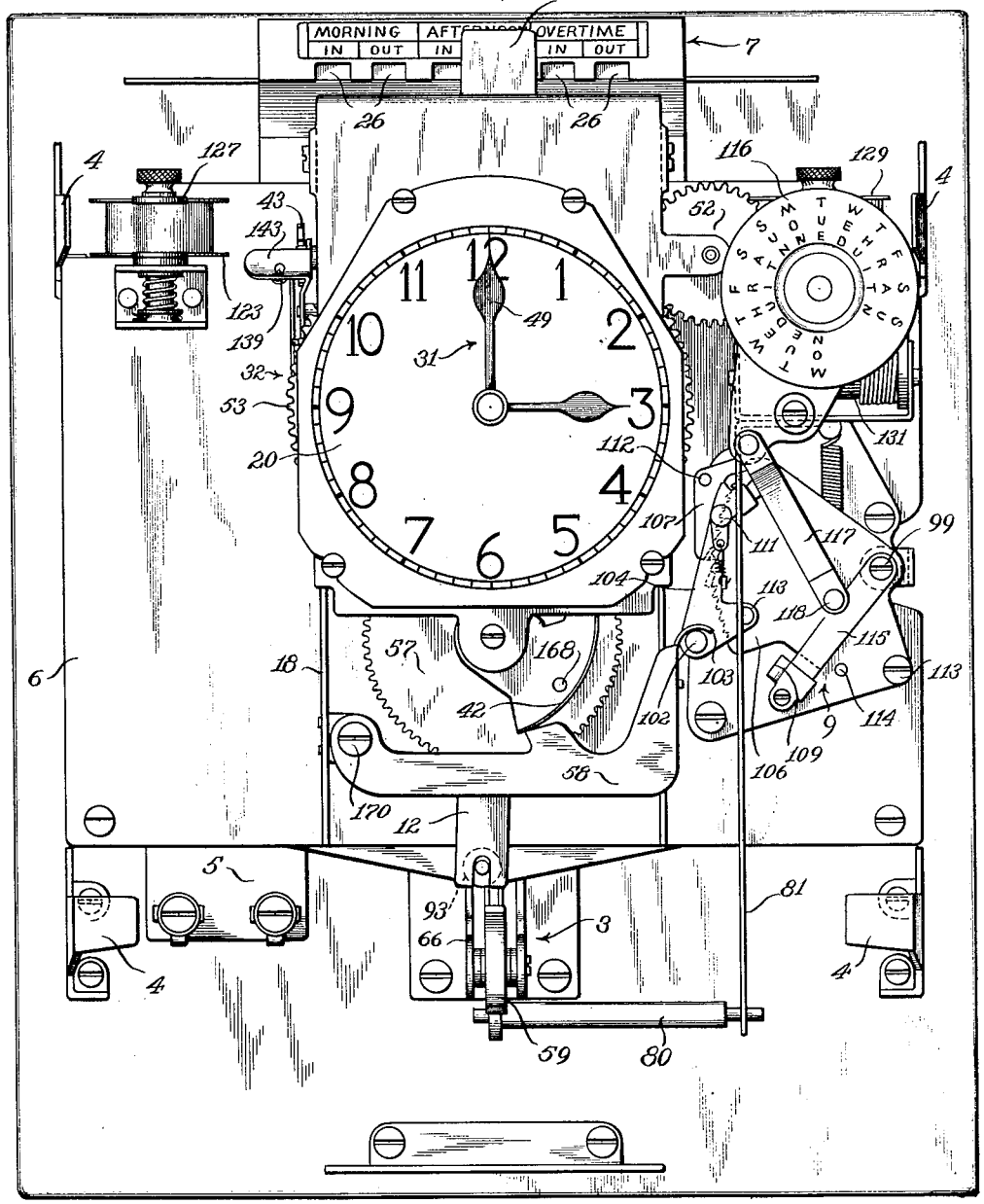

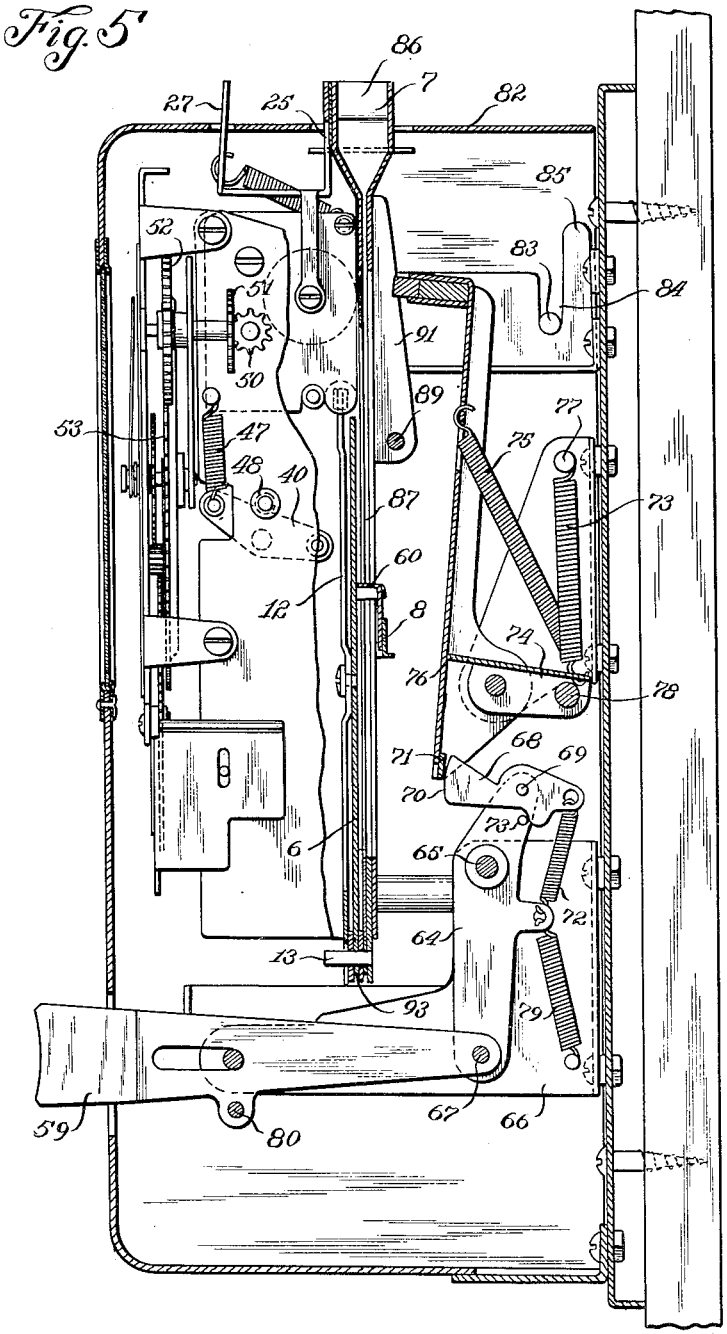

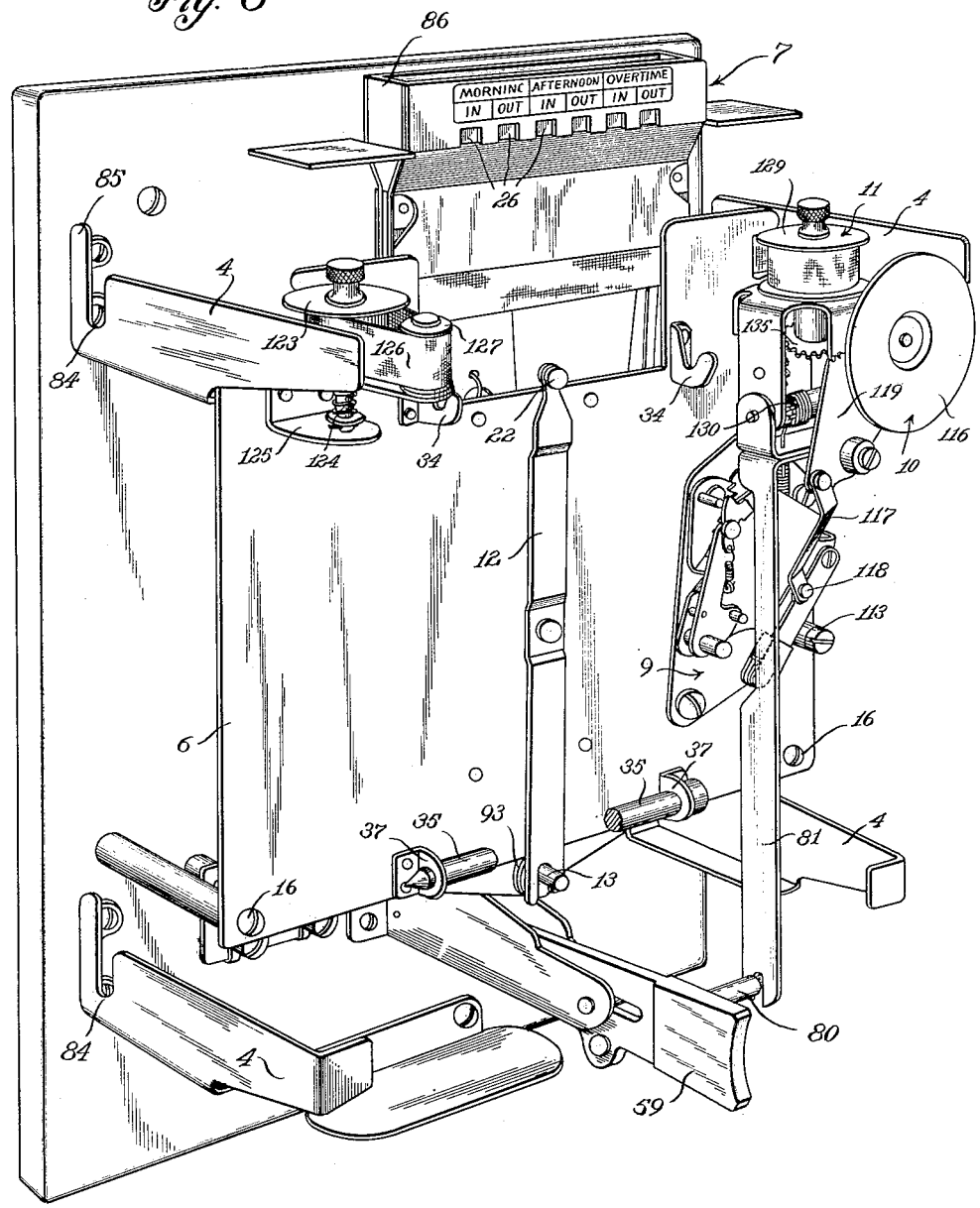

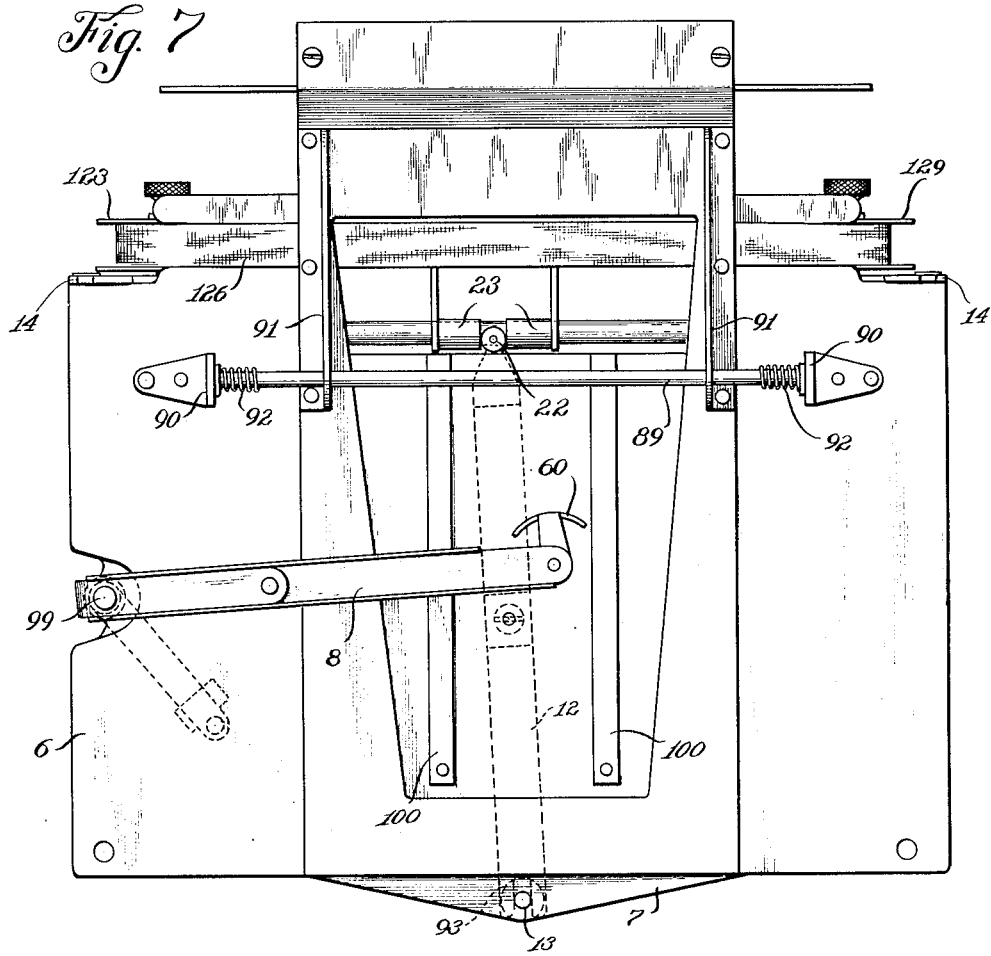

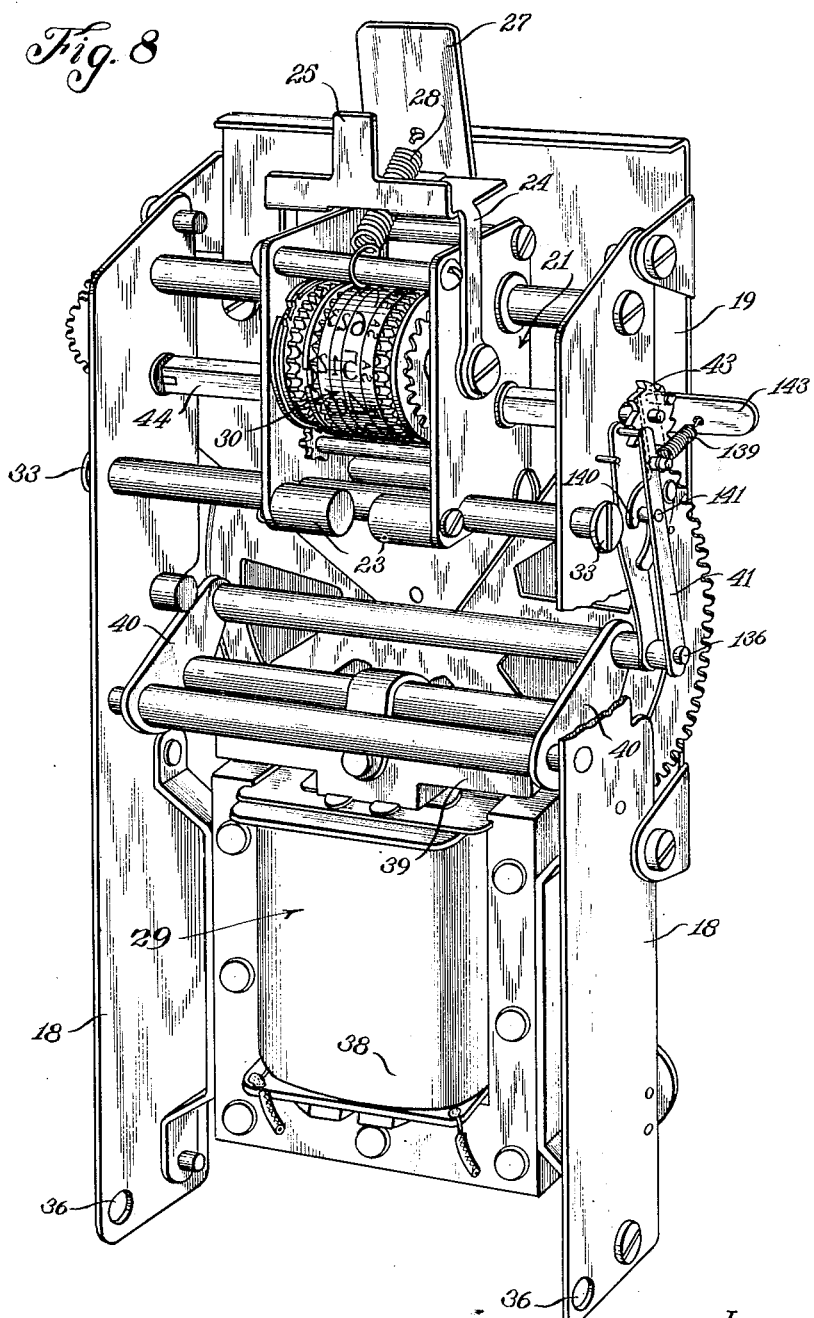

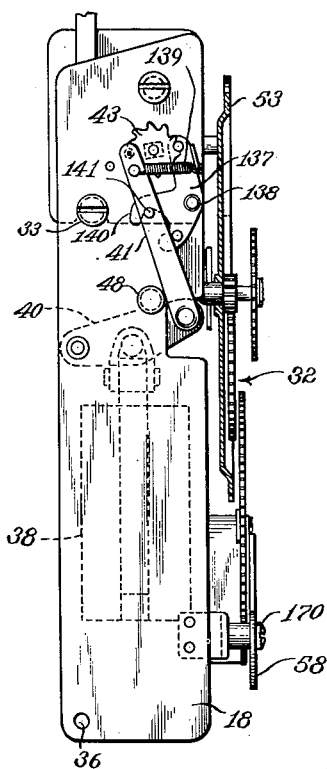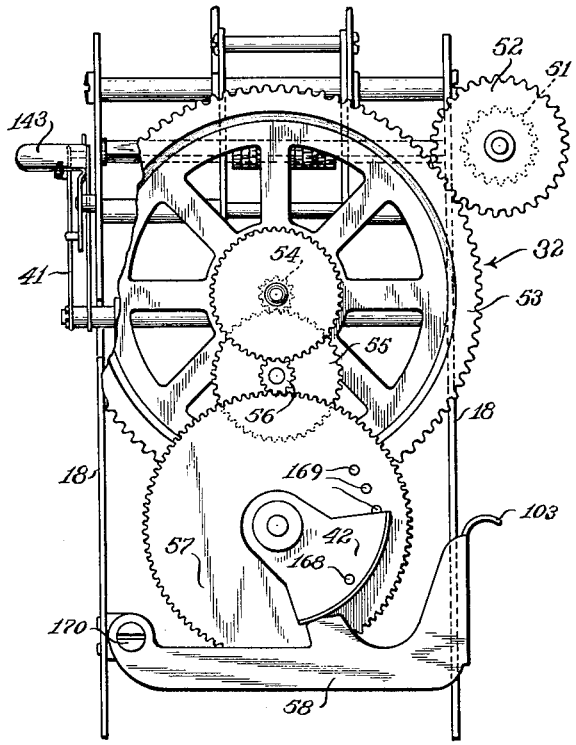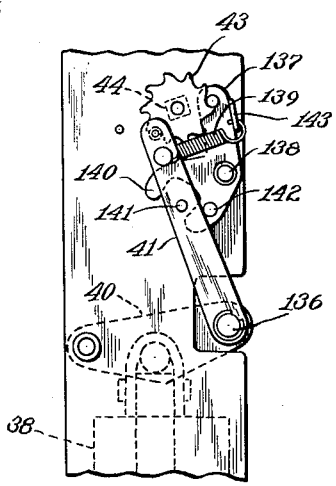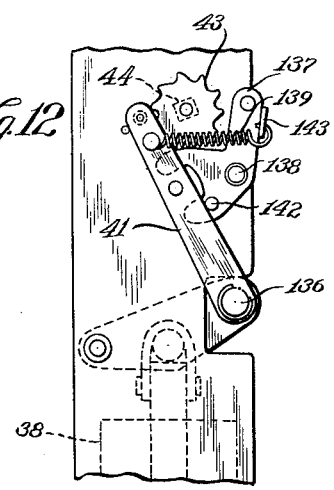

July 30, 1940. A. E. LONG 2,209,409
TIME RECORDER
Filed July 12, 1934 10 Sheets-Sheet 8
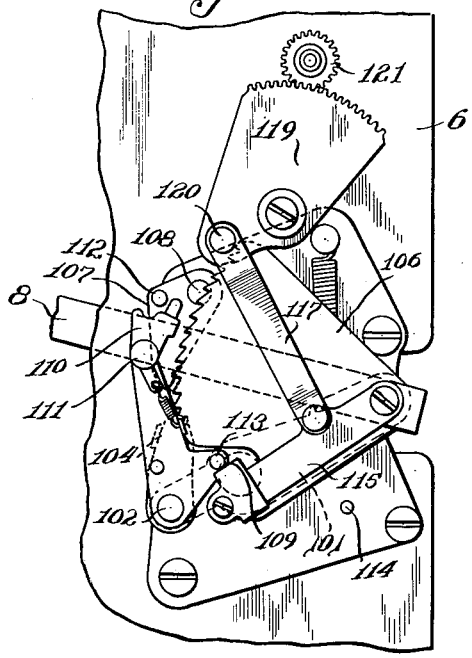
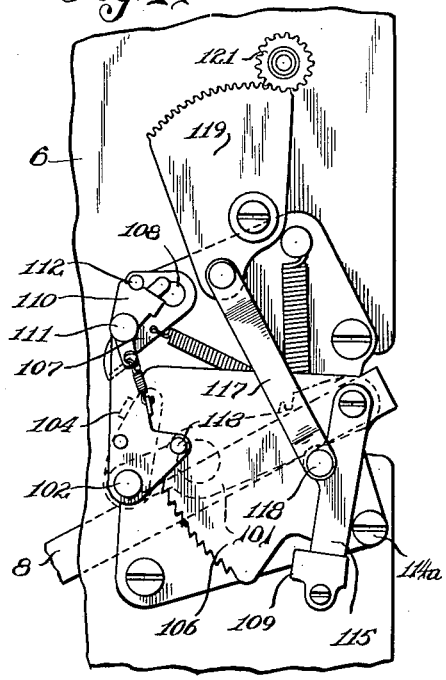
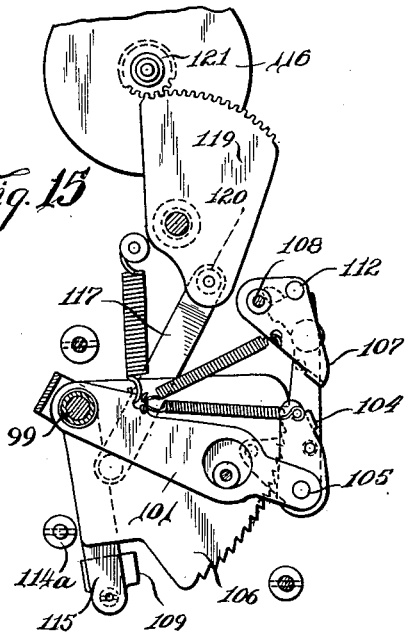
Inventor;
Albert E. Long,
By Jones, Addington, Ames & Seibold
Attys July 30, 1940.  A. E. LONG  2,209,409
TIME RECORDER
Filed July 12, 1934  10 Sheets-Sheet 9

Inventor,
Albert E. Long,
By, Jones, Addington, Ames & Seibold,
Attys

Inventor;
Albert E. Long,
By Jones, Addington, Ames & Seibold
Attys

Patented July 30, 1940

2,209,409

UNITED STATES PATENT OFFICE 2,209,409

TIME RECORDER

Albert E. Long, Chicago, Ill., assignor, by mesne assignments, to General Time Instruments Corporation, New York, N. Y., a corporation of Delaware Application July 12, 1934, Serial No. 734,767

10 Claims. (Cl. 234—43)

My invention relates to time recorders, and more particularly to in-and-out time recorders.

One of the objects of my invention is to provide a recorder that will meet all the requirements of a standard recorder, that is, print a standard legible record on a standard size time card, with provisions for varying the position where the impression is made on the card and yet reduce the size of the recorder and eliminate parts to such an extent that a marked reduction in cost of manufacture is effected.

A further object is to provide a recorder which will take up only a small amount of wall and aisle space.

Another object is to provide a small, sturdy, in-and-out recorder of unit construction that is simple, easily understandable and readily serviced because of its simplicity.

Another object is to provide a very small in-and-out recorder that will print a legible standard-sized record without reducing the accepted size of dial used on all recorders.

Another object is to provide a shifting device for lateral shifting that will require half the space that is ordinarily used for such shifting devices.

Another object is to provide a double shifting device wherein the type mechanism and the card receiver are made to cross each other or move in opposite directions at the time of shifting.

Another object is to provide a double shifting device wherein the type mechanism and the card receiver are made to cross each other and are both located and locked together at any of its several required locations.

Another object is to provide a workman's time recorder with definite linking connection between the lateral movements of the type mechanism and the card receiver.

Another object is to provide a vertical lift operating in the same plane as the record receiver.

Another object is to provide a hand or automatic card lift construction in which the card support arm and the ratchet for driving same are pivoted on the same center.

Another object is to provide a lift that can easily be changed from a weekly to a bi-weekly or semi-monthly lift without the use of interacting gears or cams.

Another object is to provide a lift that can readily be changed from one style to another by merely changing the stop pin.

Another object is to provide a hammer mechanism of the trip-off type that requires no crowding to accomplish the trip-off.

Another object is to provide a hammer mechanism that requires a small amount of power and a small stroke to secure a legible impression.

Another object is to provide a hammer mechanism that can be set in motion by an inward push on a lever or button in front of the case.

Another object is to provide a hammer mechanism that can be set in motion by a lever or button on top of the case in close proximity to the card receiver to facilitate one-handed operation.

Another object is to provide a card recorder that needs no shutter arrangement on the case to cover up the swing of the handle used for operating the hammer mechanism.

Another object is to provide a time card recorder with all the mechanisms, except the hammer mechanism, located on one center plate.

Another object is to provide a recorder with guide means for putting on or taking off the case.

Another object is to provide means for preventing the scratching of or defacing of the finish used on the back when putting the case on.

Numerous other objects and advantages of the invention will be apparent from the description and claims.

In order to understand the scope of the invention, it is believed to be desirable to describe the accepted method of in-and-out time recording and the reasons why a small recorder is desirable in the trade.

To those skilled in the art, it is a known practice to use a time card of certain standard dimensions that has come to be generally accepted by the trade and by all users of in-and-out time recorders, the approximate size of which, for a weekly record, is $3\frac{7}{16}''$ x $5\frac{1}{2}''$ and for a semi-monthly record, $3\frac{7}{16}''$ x $7''$ when the daily record of in-and-out is kept laterally on the card. When the daily record is kept vertically and the shift made laterally from day to day, the card varies from $3\frac{7}{8}''$ x $7''$ for a weekly record to $4\frac{5}{16}''$ x $7''$ for a semi-monthly record.

To succeed in printing such a record on the standard accepted card, it has been found, up to the present, that mechanism of a very complicated nature, requiring a large amount of space to enclose it, has been necessary, as, for instance, in the Crook recorder disclosed in Patent No. 1,719,000. The cubic content of this recorder is over 1450 cubic inches, and its weight approximately 50 pounds. Recorders of other makes run even higher. The resultant cost of such a large complicated mechanism makes necessary, what to the small user, is a prohibitive selling price.

The recorder about to be disclosed has a cubic content of less than 425 cubic inches and a weight of about 13 pounds, the reduced size and elimination of surplus material and parts tending toward a marked reduction in cost of manufacture. Thus, a field that the regular high-priced recorder cannot touch is opened because of the reduced selling price. To meet this field heretofore a time stamp or cost recorder has been used for in-and-out recording, but this method of recording the arrival and departure of employees is, at best, a make-shift method and cannot be used to get a full record as a time recorder proper can do. This is obvious, as neither a vertical nor a lateral shift is provided and the record must be made one under the other for the duration of a week and location of the imprint made by the workman is necessary. The time a workman spends at work is not as readily discernible with this style of recording as in the standard form of in-and-out recording where the shifts are made laterally on the card, thus causing more work for the payroll department than is necessary and more for the workman in locating his registration on the card.

It has been generally thought by the trade that it was impossible to produce the accepted record for in-and-out time recording in a recorder of such small dimensions that it would be inexpensive to manufacture and yet be sturdy enough to withstand the usual hard usage to which such a recorder is subject.

The desirability of producing such a recorder is two-fold. To the manufacturer, the small number of parts required and the small case used to enclose the mechanism insure a small manufacturing cost, while the consumer benefits by receiving a time recorder that requires less aisle space, considerably less space on the wall and yet succeeds in getting a standard in-and-out record of his employees at a reasonable price.

In the drawings, in which my invention is illustrated:

Figure 1 is a perspective view of an in-and-out recorder embodying my invention;

Fig. 2 is a plan view of a card used in this recorder;

Fig. 3 is a perspective of the rear sub-assembly, including the hammer action;

Fig. 4 is a front view of the recorder with the cover removed;

Fig. 5 is a vertical fore and aft section on the line 5—5 of Fig. 4;

Fig. 6 is a perspective view showing the intermediate sub-assembly as mounted on the rear sub-assembly, including the card receiver and ribbon feed action;

Fig. 7 is a rear view of the intermediate sub-assembly, showing the card receiver and card rest;

Fig. 8 is a perspective rear view of the front sub-assembly, showing the type carriage and the impulse drive mechanism;

Fig. 9 is a front view of the front sub-assembly with the hands, dial, dial plate and lift indicator removed;

Fig. 10 is a side elevational view from the left of Fig. 9, parts being shown in section;

Fig. 11 is a detail view of the impulse controlled pawl and ratchet mechanism showing the actuating pawl withdrawn;

Fig. 12 is a view similar to Fig. 11 but showing the retaining and actuating pawl moved out to permit setting of the clock mechanism;

Fig. 13 is a detail view of the card rest action;

Fig. 14 is a view similar to Fig. 13 but with the parts in a different position;

Fig. 15 is a view similar to Figs. 13 and 14 but taken from the rear and shows the parts in still another position;

Figure 18:
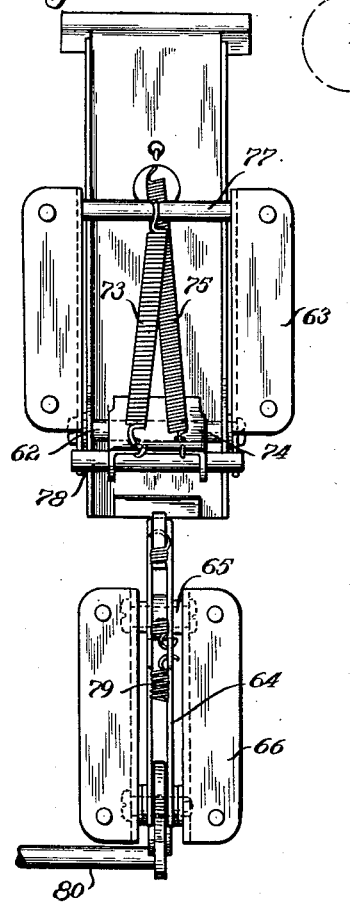
Fig. 18 is a rear view of the hammer action.

Referring to the drawings in detail, the construction shown comprises three main sub-assemblies. The first sub-assembly (Fig. 3) comprises a vertical back base plate 1, hammer mechanism 2 and a hammer-controlling mechanism 3 mounted thereon, four guiding and supporting members 4 supported by and extending forwardly from the back base plate 1 for supporting and guiding the other sub-assemblies and the cover or casing, and a wiring base 5 for the connection of the feed wires.

The second intermediate sub-assembly (Figs. 6 and 7) comprises a flat vertical base plate 6, parallel to the rear base plate 1, a card receiver 7, slidably mounted for horizontal movement in the rear of the base plate 6, a card rest arm 8 movable in a plane adjacent, in the rear of and parallel to the card receiver 7, time controlled actuating mechanism 9 for the card rest arm mounted in the front of the base plate 6, indicating mechanism 10 for indicating the vertical position of the card rest, also mounted on the front of the base plate, ribbon feeding and supporting mechanism 11, also mounted on the front of the base plate 6, and a centrally pivoted rock arm or lever 12 mounted on the front of the base plate and having a pin and slot connection 13 at its lower end with the horizontally slidable card receiver 7. This sub-assembly is secured to the rear sub-assembly by means of a pair of holes 14 which fit over the tapering vertical pins 15 on the upper pair of supports 4 on the rear base plate, and a pair of screws 16 extending through the lower portion of the base plate and threaded into pillars 17 secured to and extending forwardly from the rear base plate 1.

The third front sub-assembly (Figs. 8, 9 and 10) is supported on and carried by the intermediate sub-assembly and comprises a pair of vertically extending, spaced, parallel, sheet metal side plates 18, to which is secured a front, vertical sheet metal frame plate 19 on which the clock dial 20 is mounted. Between the side plates is slidably mounted for transverse horizontal movement the type carriage 21, in which are mounted the impulse clock driven type wheels. This type carriage is connected with the aforesaid horizontally and laterally slidable card holder 7, through the medium of the aforesaid centrally pivoted rock arm 12, in such manner that when the type carriage 21 is shifted laterally and horizontally in one direction, the card receiver 7 will be shifted laterally and horizontally in the opposite direction. This opposite movement of the two parts is effected by the engagement of the upper end 22 of the centrally pivoted rock arm between the two spaced followers or abutment members 23 on the type carriage (Figs. 7 and 8).

A positioning interlock is provided between the horizontally slidable type carriage 21 and the horizontally slidable card receiver 7 by means of a pivoted latch yoke 24 straddling the type carriage and rockably mounted thereon, which has an upwardly-extending finger 25 which is engageable in any one of the pockets or depressions 26 formed on the upper front portion of the horizontally slidable card receiver 7 (Figs. 4, 5, 6 and 8). To place the type carriage 21 and card receiver 7 in the desired adjusted position to secure the proper placing of the printing imprint, the operator tilts the latch yoke forward by means of the upwardly-extending finger piece 27 thereon and shifts the type carriage 21 in one direction or the other to bring the positioning finger 25 on the latch yoke opposite the desired one of the pockets or depressions 26 in the card receiver. The operator then releases the latch yoke, whereupon the spring 28 pulls the latch yoke rearwardly to bring the finger 25 into the desired depression 26 in the card receiver to hold the type carriage and card receiver in the desired position of relative lateral adjustment.

This third front sub-assembly comprises, in addition to the frame, type carriage and type carriage guides mentioned above, electromagnetic actuating mechanism 29 (Fig. 8) for the timed periodic actuation of the type wheels 30, time-indicating mechanism 31 and transmission 32 therefor, mounted mainly on the front plate of the frame and driven in synchronism with the time printing type wheels, and the aforesaid time-controlled mechanism 9 for controlling the intermittent movement of the aforementioned card rest arm mounted on the intermediate assembly. This third sub-assembly is mounted on the second sub-assembly by means of a pair of headed pins 33 which fit in hook-like members 34 projecting forwardly from the intermediate base plate and a long pin 35 extending through holes 36 in the side frame members 18 and registering holes in the brackets 37 secured on the lower front portion of the intermediate base plate 6 (Figs. 6 and 8).

Before describing in further detail the various parts of the mechanism, I will outline in a general way the operation.

IMPULSE-CONTROLLED DRIVE FOR TYPE WHEELS, TIME-INDICATING MECHANISM AND CARD REST CONTROL

*(Figs. 4, 5, 6 and 8 to 12)*

In the system in which this recorder is used, minute impulses are sent out from the central master clock. Each minute impulse energizes the electromagnet 38, drawing the armature 39 downwardly. This effects a downward rocking movement of the rock frame 40 which carries the drive pawl 41 for the type wheels, the clock hands and card rest cam 42 (Fig. 4).

The transmission from the drive pawl 41 to the Geneva drive for the type wheels 30 comprises a ratchet wheel 43 driven from the drive pawl 41, a squared shaft 44 rotatable with the ratchet wheel, and a pinion (not shown) slidably mounted on the squared drive shaft 44 and meshing with the Geneva gear. By means of this slidable connection with the squared shaft 44, the type wheels will be properly driven, no matter in what position of lateral adjustment the type carriage 21 may be placed.

The actual driving movement of the time-controlled mechanisms is effected by means of a spring 47 (Fig. 5) secured to the rock frame 40 which draws the rock frame upwardly when the electromagnet 38 is de-energized. Stops 48 are provided to limit the upward movement of the rock frame.

The drive for the minute hand 49 of the clock is from the aforesaid squared shaft 44, through a pinion 50 (Fig. 5) rotatable with this shaft, a gear 51 (Figs. 5 and 9) driven from this pinion 50, a larger gear 52 rotatable with the gear 51, and a large gear 53 meshing with the aforesaid gear and rotatable with the minute hand. Any suitable or usual drive may be provided for the hour hand.

The drive for the card rest cam 42 (Figs. 4 and 9) is from a small pinion 54 rotatable with the large gear 53, a gear 55 meshing with this pinion 54, a small pinion 56 rotatable with this gear 55, and a large gear 57 meshing with this pinion 56 on which gear 57 the card rest cam 42 is mounted and with which it is rotatable.

This cam 42 periodically depresses the card rest controlling rock arm 58 and releases it abruptly after it has been withdrawn to allow a one step movement of the card rest arm 8 which will vary the distance which the card may be inserted into the receiver a single step.

From the above, it will be seen that each minute impulse of the master clock causes the type wheels to be advanced one step and also causes the time-indicating mechanism to be advanced one step in synchronism with the type wheels so that the hands of the clock will show the time which will be printed by the type wheels when the hammer is actuated. It will also be seen that the time-controlled movement of the card rest cam will periodically (once every twenty-four hours) cause the position of the card rest to be changed one step to vary the distance which the card may be inserted into the card receiver.

*Manual adjustment for printing position*

In selecting the column on the card in which it is desired the imprint shall be made, the operator pulls the spring-pressed latch yoke forward by means of the upwardly-extending finger piece 27 and, using this finger piece as a handle, shifts the type carriage laterally to bring the positioning finger 25 on the latch yoke opposite the notch 26 in the card rest corresponding to the column in which it is desired that the imprint shall be made. The operator then releases the latch yoke, permitting the positioning finger to enter the selected pocket in the card receiver. This definitely positions and latches the type wheels and card receiver with respect to each other so that when the imprint is made, it will be made in the desired column of the card.

*Hammer action and ribbon feed*

Both the printing action and the ribbon feed are controlled by the hammer controlling push bar 59 which extends forwardly through an opening in the case. In use, the workman inserts his card in the card receiver, allowing it to rest on the curved portion 60 of the card rest which insures the proper time-controlled vertical adjustment for the card, the type carriage having already been adjusted to insure printing in the proper column. The workman then pushes inwardly on the push bar 59 which causes the withdrawal and release of the hammer and a slight advance of the ribbon feed.

Details of Rear Sub-Assembly

Figure 17:
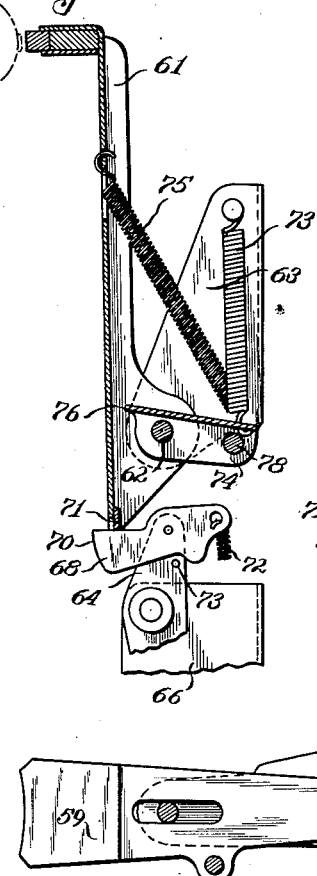
Fig. 17 is a view similar to Fig. 16 but with the parts in a different position.
Figure 16:
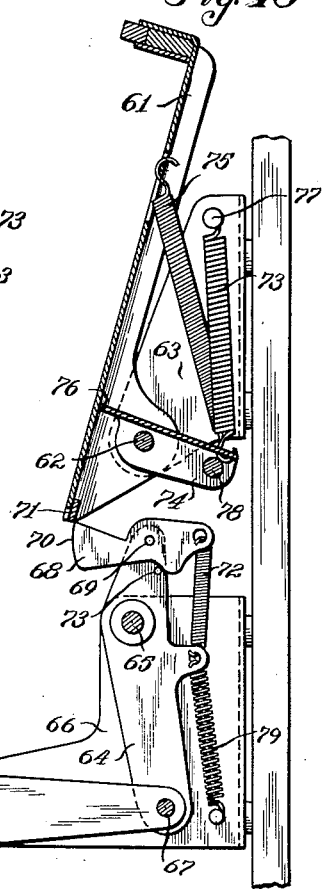
Fig. 16 is a fore-and-aft sectional view showing the hammer action.

The hammer 61 is pivotally mounted at 62 on a bracket 63 secured to the rear base plate 1. The hammer withdrawal and releasing mechanism controlled by the manually operated push bar 59 comprises a rock lever 64 (Figs. 3, 5, 16, 17 and 18) pivotally mounted at 65 on a bracket 66 secured to the back plate 1 and also pivotally at 67 secured to the push bar 59, and an operating dog 68 rockably mounted at 69 on the upper end of the rock lever 64 and having an arcuate portion 70 engageable with and slidable along a wear plate 71 on the hammer below the pivot 62 of the hammer. A coil spring 72 tends to hold the front end of the operating dog in raised position abutting the stop pin 73. As the push bar 59 is pushed inwardly, the upper end of the rock lever 64 is rocked forwardly, causing the arcuate face 70 of the rocking dog to push the lower end of the hammer forwardly. The movement inwardly of the push bar causes the arcuate face 70 of the actuating dog to slide downwardly with respect to the wear plate 71 of the hammer until finally the actuating dog completely disengages the lower edge of the wear plate. This releases the hammer, allowing the hammer-actuating spring 73 to throw the hammer forwardly to effect the printing operation. In order to enable the final printing action of the hammer to take place under its own momentum and also to cause a partial withdrawal of the hammer after printing, to bring it in position for re-engagement with the hammer actuating mechanism 68 at the proper time, a spring lost motion connection is provided between the hammer actuating spring 73 and the hammer 61. This lost motion spring connection comprises a rock member 74 pivoted coaxially with the hammer and a coil tension spring 75 secured at one end to the rock member 74 and at the other end to the hammer. This spring tends to hold the hammer in engagement with the abutment portion 76 on the rock member. The hammer-actuating spring 73 is connected at one end to the rock member 74 and at the other end to a pin 77 supported by a hammer bracket. The movement of the rock member under the action of the hammer-actuating spring is limited by the engagement of the pin 78 on the rock member with the hammer bracket 63. When the hammer is drawn back from the position of Fig. 5 to the position of Fig. 16 and released by the hammer-withdrawing dog, the hammer-actuating spring snaps the rear end of the rock frame upwardly from the position of Fig. 16 to the position of Fig. 17 until the pin 78 on the rock frame is stopped by engagement with the hammer bracket 63. From this point, the momentum of the hammer carries the upper end of the hammer forwardly to effect the printing operation as in Fig. 17, this momentum motion being effected against the resistance of the comparatively light spring 75 connecting the hammer with the rock member 74.

After the hammer has effected the printing operation, this light spring withdraws the hammer until it reengages the abutment 76 on the rock frame. This brings the lower end of the hammer back into a position so that when the hammer controlling push bar is released and returns to its forward position under the action of the spring 79 acting on the rock lever 64 the hammer-actuating dog 70 will ride underneath the lower edge of the hammer and finally snap upwardly behind the hammer into position to withdraw the hammer the next time the push bar 59 is pushed inwardly. It will be noted that the arcuate edge 70 of the hammer withdrawing dog has its center at the pivotal point of this dog so that there is no "crowding" action of this dog in the hammer-withdrawing movement; that is to say, no changing of the distance between the pivot of the dog and the engaging portion of the hammer-withdrawing dog. This is one of the factors which enables the hammer to be withdrawn by a pressure which is about half that usually required for hammer actuation and by a range of movement which is substantially one-third of that usually required for hammer actuation in in-and-out recorders.

Each operation of the push bar 59 effects a slight feeding movement of the ribbon. This is accomplished by means of a pin 80 (Figs. 3, 4, 6 and 18) mounted on the push bar 59 which engages a notch on the lever 81 which actuates the ribbon feed.

The four forwardly-extending supporting members 4, not only serve to support the intermediate sub-assembly but also guide the cover 82 when it is being placed in position. For this purpose, the cover 82 is provided with four inwardly-extending pins 83 (Figs. 3 and 5) which are positioned so as to engage the upper horizontal edges of the four forwardly-extending supports 4 when the cover is being slipped into position. This inter-engagement between the cover and the four supports prevents the cover from bumping into the mechanism housed by the cover in placing the cover in position. Each of the forwardly-extending brackets is provided with a deep notch 84 at its rear portion into which the four pins on the cover drop when the cover is in the proper position. In order to prevent the edges of the cover from bumping the rear plate 1 and thus marring its finish, each of the four supporting members 4 is provided with an upwardly-extending abutment 85 which is so placed that it will be engaged by a pin 83 on the cover before the edge of the cover can engage the finish on the rear base plate.

Details of Intermediate Sub-Assembly

Card receiver

The card receiver (Figs. 4, 5, 6 and 7) is a flat construction having a funnel entrance 86 to facilitate the entry of the card and side grooves 87 to receive the side edges of the card 88. The card receiver is guided in its lateral movement by means of a guide rod 89 carried by brackets 90 secured to the rear face of the base plate 6 and extending through openings in brackets 91 secured to the rear face of the card receiver.

Spring bumpers may be provided at each end of the guide rod, in the form of coil compression springs 92 engageable by the brackets on the card receiver, at the extremes of the card receiver movement. The lower end of the card receiver is guided and held in proper position by means of a grooved button 93 secured to its lower end in the groove of which the lower edge of the base plate 6 is received. This button is secured in place by the pin which engages the notch in the lower end of the rock lever 12 to form the pin and slot connection 13 between the sliding card receiver and the sliding type carriage.

Card rest and actuating mechanism

The card rest itself is of very simple construction comprising the card rest arm 8 pivotally mounted at 99 on the plate 6 and a card rest finger secured to this rock lever and having an arcuate portion 60 for engagement with the lower edge of the card. In order to prevent any possibility of the card slipping in between the base plate and the edge of the card-engaging finger, a pair of spacing strips 100 are secured to the rear face of the base plate 6 between which strips the card-engaging finger 60 operates. These strips serve to space the card from the base plate 6, thus insuring that the card rest finger will always lie underneath the lower edge of the card.

It will be recalled that the time-controlled card rest cam 42 periodically (once every 24 hours) gradually pushes the card rest controlling arm 58 downwardly and suddenly releases it. This gradual withdrawal and sudden release of the card rest controlling arm effects a one-step movement of the card rest lever. The mechanism by which this is accomplished (Figs. 4, 13, 14, and 15) comprises a rock arm 101 pivoted at 99 on which a pin 102, engaged by a hook 103 on the arm 58 is mounted, a pawl 104 pivotally mounted at 105 on the end of this rock arm 101, and a ratchet segment 106 actuated by this pawl and movable with the card rest arm 8. Each time the pin 102 is withdrawn and released, the ratchet segment 106 will be given a one-step movement which will, in turn, give a one-step movement to the card rest arm 8, thus variably limiting the distance to which the card may be inserted into the receiver. A suitable retaining pawl 107, pivoted at 108, is provided to prevent retrograde movement of the ratchet segment 106 when the pin is again being withdrawn for effecting another stepped movement.

In in-and-out recorders, it is desirable that when the card rest has been stepped up to its extreme upper limit of movement, it should be automatically returned to its extreme lower limit of movement. Thus, if the card has provisions for taking care of seven successive days, it is desirable that at the end of the seventh day the card rest should be returned to its original position to take care of the ensuing week. For this purpose, means are provided so that when the card rest has been stepped up to its extreme upper limit of movement, the next withdrawal and release of the actuating pawl 104 will cause a disengagement of the retaining pawl 107 to allow the card rest 8 to drop by the action of gravity to its extreme lower position. The construction by which this throw-out of the retaining pawl 107 is accomplished comprises an abutment member 109 movable with the ratchet plate, a pin 113 movable with the actuating pawl engaged by this abutment member, and a spring-held dog 110 pivotally mounted at 111 on an extension of the operating pawl 104 and engageable with a pin 112 mounted on the retaining pawl 107. In operation, when the card rest has been moved to its extreme upper position, the abutment member 109, which is movable with the ratchet segment 106, will have been moved up to a position so that the next time the cam-controlled pin 102 is drawn downwardly, the pin 113 on the actuating pawl will engage the abutment member 109, as shown in Fig. 13 causing the upper end of the extension arm of the pawl to be swung into a position in which the dog 110 on the upper end of this extension arm will engage the pin 112 on the retaining pawl 107 when the actuating pin 102 is released for its upward movement. This engagement of the dog 110 with the pin 112 on the retaining pawl will throw the retaining pawl 107 out of engagement with the ratchet segment 106, as shown in Fig. 15, and will also hold the actuating pawl 104 out of engagement with the ratchet segment 106 because of the forked construction of the dog which causes it to straddle the pin 112 on the retaining pawl. As thus both the retaining pawl and the actuating pawl are temporarily held out of engagement with the ratchet segment 106, the card rest will drop by gravity to its lowermost position, where it is ready to repeat the cycle. The next downward withdrawal movement of the actuating pin 102 will allow the retaining pawl 107 to re-engage the ratchet segment 106, will free the forked dog 110 from the pin 112 on the retaining pawl 107 and will thus allow the actuating pawl 104 to again engage the ratchet segment, thus placing the parts in position for a time-controlled step by step movement of the card rest.

Some time cards are made to take care of seven days; some to take care of fourteen days, and some to take care of sixteen days. The adjustment of the range of movement of the card rest can be made in a very simple manner in the above-described construction. For a seven-day card, the stop pin 114a which limits the lowermost position of the ratchet segment, and hence of the card rest, is threaded into the short range opening 114 which limits the card rest movement to seven days. For a fourteen-day movement, the stop pin is threaded into a long range opening, which allows a fourteen-day movement of the card rest. For a sixteen-day movement, the abutment member 109 is removed so as to allow two additional stepped movements to be made. With the abutment member removed, the step by step movement of the ratchet plate may be continued until the strip or arm 115 on which the abutment member 109 was mounted is moved up far enough to serve as an abutment member. This allows two additional days' movement to provide for a sixteen-day period.

In order to indicate the position of the card rest a rotatable dial 116 bearing the indicia for the successive dates is provided. This dial is connected with the ratchet segment 106 so that each step movement of the ratchet segment communicates a corresponding stepped movement to the dial. The connection from the ratchet segment to the dial comprises a link 117 pivotally secured at 118 to the aforesaid arm 115 which, in turn, is secured to move with the ratchet plate 106, a gear segment 119 to which the upper end of the link is pivoted at 120, and a pinion 121 meshing with the gear segment and rotatable with the indicating dial 116. With this construction, each stepped movement of the ratchet segment will bring the indicia for the succeeding day opposite the sight opening 122 in the casing (Figs. 1 and 4).

*Ribbon feed and support (Figs. 4, 6 and 7)*

The ribbon feed is in one direction only. The spool 123 from which the ribbon is to be unwound is mounted on a pin 124 supported in a bracket 125 extending forwardly from the intermediate base plate 6 in such a manner as to have a friction drag. From this spool, the ribbon 126 passes over an idler roller 127 positioned adjacent the sight opening 128 in the casing (Fig. 1). From this idler roller 127 the ribbon passes to the rear of the base plate 6 and across the rear face of the base plate to the take-up spool 129. The vertical position of the spools is such that the ribbon extending across from one spool to the other will be positioned properly with respect to the hammer and type wheels. These spools may be so positioned that only half of the width of the ribbon will be in cooperative relation with respect to the hammer and type wheels so that when the ribbon has been fed substantially its entire length, the spools may be inverted by interchanging the spools on their spindles so as to bring the unused half of the ribbon into proper cooperative relation with respect to the hammer and type wheels.

As indicated above, the drive for the take-up spool 129 is from the push bar 59 which the workman operates when he effects a printing operation. The transmission from the hammer-controlling push bar to the take-up spool (Figs. 4 and 6) is fully described in the co-pending Long application Serial No. 275,859 filed May 26, 1939, which is a division of Serial No. 89,795 filed July 9, 1936.

This one-way coil spring drive and retainer construction enables a very slight rocking movement of the rock arm 81 to be transmitted with very little lost motion to the take-up spool 129.

As there is no reversing mechanism for the ribbon, it is desirable that some means be provided for showing when the end of the ribbon is about to be reached. For this purpose, I provide each end of the ribbon with a distinctive color so that when the ribbon is about all unwound this distinctive color will be displayed in the sight opening 128 in the casing, indicating that a new ribbon should be put in place or the ribbon which is being used should be inverted. Several methods of signaling the approach of the end of the ribbon are fully described and claimed in the co-pending Long application Serial No. 89,795 filed July 9, 1936, and a division thereof, Serial No. 275,860 filed May 26, 1939.

DETAILS OF FRONT SUB-ASSEMBLY

*Pawl drive for type wheels*

The pawl drive for the type wheels comprises the actuating pawl 41 pivotally mounted at 136 on the rock frame 40, a retaining pawl 137 pivotally mounted at 138 on the side plate 18, and a spring 139 connecting these two pawls, tending to hold both of the pawl pins in engagement with the teeth of the ratchet 43. The two pawls are so inter-related that the ratchet wheel is held against movement in both extreme positions of the rock frame 40. In the upper position of the rock frame (Fig. 10), the actuating pawl 41 is held in engagement with the ratchet teeth by means of a hooked member 140 on the retaining pawl 137 which hooks over a spacer pin 141 on the actuating pawl. In the lowermost position of the rock frame (Fig. 11), the retaining pawl 137 is held in engagement with the teeth of the ratchet because of the engagement of the pin 142 on the retaining pawl with the edge of the actuating pawl 41.

To enable the release of both pawls from engagement with the ratchet wheel to facilitate setting of the type wheels and clock hands, the retaining pawl 137 is provided with an actuating handle 143 which can be drawn forwardly to throw the retaining pawl out of engagement with the ratchet wheel. This throwing out of the retaining pawl at the same time throws out of the actuating pawl 41 because of the engagement of the pin 142 on the retaining pawl with the edge of the actuating pawl (Fig. 12). With both pawls thus held out of engagement, the clock hands and type wheels may be easily set by turning the minute hand or one of the gear wheels forming part of the clock train.

*Card rest cam and follower*

The cam 42 which controls the card rest control follower 58 is adjustable about the axis of the gear 57 which carries it, in order to enable the time at which the card adjustment takes place to be varied. In order to hold this cam in any of its adjusted positions, it is provided with a depressed portion 168 which can fit into any one of a number of holes 169 in the gear 57 (Fig. 9). The cam control follower is pivotally mounted at 170 on the bracket on the side frame member and is provided with the hooked end 103 for engaging over the hereinbefore described pin 102 which controls the pawl 104 which actuates the ratchet segment 106.

Figure 19:
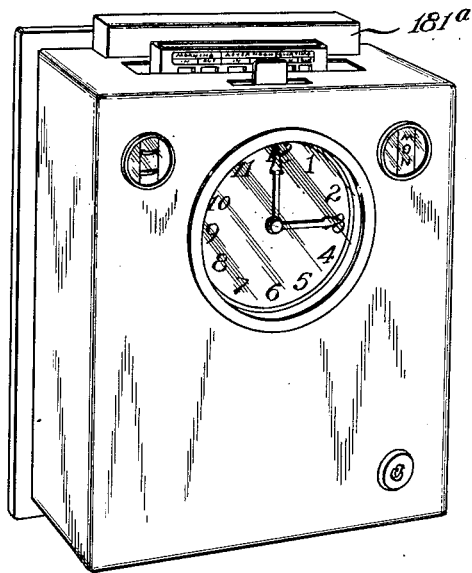
Fig. 19 is a perspective view of a recorder with a different form of hammer action.
Figure 20:
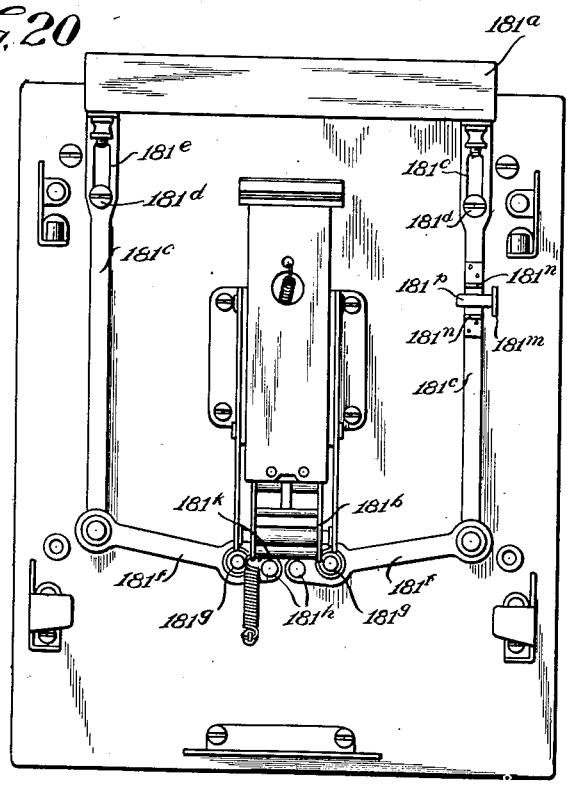
Fig. 20 is a face view of the hammer action of Fig. 19.
Figure 21:
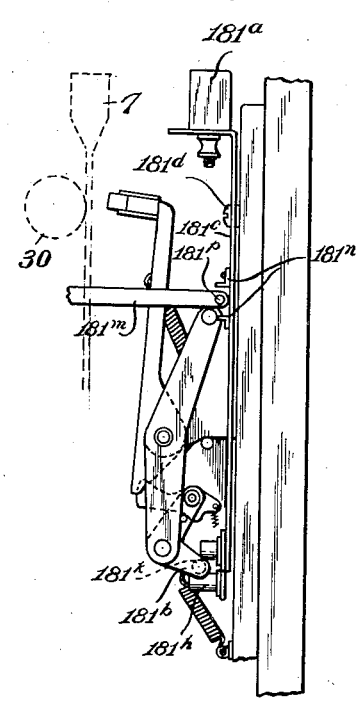
Fig. 21 is a side elevational view of Fig. 20.

In Figs. 19, 20 and 21, there is shown another form of hammer actuator in which an elongated push bar 181$^a$ is provided adjacent and extending along the rear of the card receiver 7 so that it may be operated by the hand holding the card no matter what portion of the card is gripped and regardless of whether it is gripped by the right hand or left hand. In this form, the transmission from the push bar 181$^a$ to the hammer actuating lever 181$^b$ comprises a pair of vertically movable links 181$^c$ secured to the push bar and guided in their vertical movement by screws 181$^d$ extending through slots 181$^e$ in the links and threaded into the back base plate 1, and a pair of rock levers 181$^f$ pivotally secured to the lower ends of the vertically movable links, respectively pivotally mounted on the back base plate at 181$^g$ and provided with pins 181$^h$ for engaging a cross bar 181$^k$ on the hammer actuating lever. With this construction, it will be seen that pressure on any part of the horizontal push bar 181$^a$ will exert pressure downwardly on one or both of the vertically movable links 181$^c$, which will cause the withdrawal and tripping action of the hammer, as in the form previously described.

In this form, the ribbon feed is actuated by means of a rock lever 181$^m$ which rocks the aforementioned spring 130, the rocking action of the lever 181$^m$ being effected by means of a pair of clips 181$^n$ which engage opposite sides of a pin 181$^p$ on the rock lever 181$^m$.

It will be seen that, to accomplish the startling reduction in size and, therefore, cost, new and novel features have been introduced. The card receiver and printing mechanism have been made to move in opposite directions when a lateral shift is made, thus reducing by one-half the distance required to travel across the card and thus reducing the width of the recorder.

This differs from the present recorders, as in these either the printing mechanism is moved across the full printing width of the card, as in Crook Patent No. 1,719,000, or the printing mechanism is held stationary and the card receiver is moved across it for the full printing width of the card as in all other in-and-out recorders, in both cases requiring twice the amount of space necessary to accomplish the same result.

In addition to these advantages, the double shift method is accomplished by the movement of one lever which upon coming to rest at a designated column, acts as a direct and positive lock between the card receiver and the type mechanism, there being absolutely no leeway or lost motion between the two at the time the impression is made and no aligning means or extra mechanism is needed to insure the impression being made within the space allowed for it on the card.

The card lift, by a new and novel arrangement, is made to travel in the same plane as the card receiver, which is contrary to general practice and requires a very small amount of space to accomplish the desired result of varying the position on the card vertically, thus reducing the depth of the recorder.

Besides operating in the same plane, the compactness of the vertical lift mechanism is accomplished by using a direct ratchet drive from the same center that the lift arm itself swings on, doing away with all inter-acting gears, shifts, bearings and cams. An entire additional set of cams and gears is required to change the vertical lift from a weekly to a bi-weekly or semi-monthly style in other styles of card lifts. In the lift mechanism disclosed it is only necessary to change the stop pin employed to different positions to accomplish a change in the capacity of the lift.

In other card recorders the hammer mechanism and the handle necessary to put it in motion is of a type that requires from five to seven pounds pressure to feed the ribbon, accurately locate the type mechanism on the card receiver and accomplish the desired legible imprint on the time card. In addition, the handle which is either at the front or side of the recorder case, requires from 1½" to 2½" downward move to build up the power necessary to accomplish the desired results. As opposed to the ratchet and cam hammer mechanism, as disclosed in the Crook Patent No. 1,719,000 which requires over five pounds pressure and 1½" stroke to arrive at the trip off point, and the slide-off mechanism used in other card recorders which rely on a crowding action to accomplish the trip-off and which requires even more than five pounds pressure and a long stroke to overcome, the hammer mechanism used in this recorder is condensed in such a form that the impression is made by an inward push of the lever and requires but two and one-half pounds pressure and a ½" stroke to accomplish the trip-off. Thus a decided reduction in the length and depth of the recorder case is accomplished.

The push-in method employed to trip the hammer mechanism also eliminates the necessity of a large hole in the case that the long swing handle requires and the consequent shutter arrangement necessary to cover up this hole.

In disclosing this compact hammer mechanism with the push method of trip-off, it is not desired to confine the push-off method to a lever or button in front of the case. It is also desirable to have this trip-off lever or button operable from the top of the case in close proximity to the funnel whereby a push at the lever or button will set the hammer mechanism in motion. This facilitates one handed operation of recording and in addition not only eliminates the shutter arrangement spoken of before, but also reduces to a greater extent the aisle space required when the lever or button is placed in front of the recorder.

All of the mechanism described above, with the exception of the hammer mechanism, is assembled on one central plate—that is, the type mechanism, the ribbon mechanism, the card lift mechanism, the shifting mechanism and the card receiver, and, in addition, each of these separate mechanisms can be detached from the center plate.

This is an unique and novel arrangement in time recorder construction and eliminates the usual long shafts, gear trains, supporting plates, pillars and castings usually employed. The resultant simplicity and the ease with which the recorder can be serviced is at once apparent to both those skilled in the art and the layman.

The center plate with all its units is hung on two supporting tracks that project from the back of the recorder and supported by two pillars at the bottom. To disconnect the center plate it is only necessary to remove the two screws in the pillars and the whole mechanism can be lifted out of the recorder. In addition, these tracks are also used as guides when putting the case on or taking it off, protecting the enclosed mechanism from injury. They are also constructed so that when sliding the case on, the case is prevented from touching the back and scratching or defacing the enamel or finish used thereon.

With all these new and novel combinations, the length, depth and width have been reduced to a startling degree and yet the recorder will accomplish the same results and give the same legible record on the same size of card, with the same number of spaces that have become standard in the trade, it having lost none of its efficiency in the marked reduction in size. The resultant saving in the cost of manufacture makes it a very desirable recorder in the field for which it was designed.

Further modifications will be apparent to those skilled in the art and it is desired, therefore, that my invention be limited only by the prior art and the scope of the appended claims.

Having thus described my invention, what I claim and desire to secure by Letters Patent is:

1. In a machine for printing upon workmen's identification sheets inserted therein the time of their insertion, a sheet holder shiftable to move the sheet laterally, a type carriage shiftable laterally across the face of the sheet, means for moving said sheet holder and type carriage simultaneously in opposite directions, and means for holding said sheet holder and type carriage in any one of a number of adjusted positions.

2. A printing construction comprising three readily attachable and detachable sub-assemblies, the first sub-assembly comprising a vertical base plate and a hammer-actuating mechanism mounted on said base plate, said second sub-assembly comprising a supporting plate detachably supported by the base plate, a sheet holder slidably mounted on the rear of said supporting plate, a sheet rest comprising an arm pivotally mounted on said supporting plate to move in a plane parallel to the sheet, ribbon feed mechanism mounted on the front of said supporting plate and actuating mechanism for the sheet rest mounted on the front of the plate, said third sub-assembly comprising a supporting frame readily attachable and detachable with respect to said supporting plate, type wheels mounted on said frame, and a time-controlled driving mechanism for driving the type wheels and controlling the sheet rest and ribbon feed also mounted on said supporting frame.

3. In a machine for printing upon workmen's identification sheets inserted therein the time of their insertion, a laterally movable sheet holder, a laterally movable type carriage, and means connecting said sheet holder and said type carriage whereby lateral movement of one causes a simultaneous opposite lateral movement of the other.

4. In a machine for printing upon workmen's identification sheets inserted therein, the time of their insertion, a sheet holder, a type carriage, and means for simultaneously shifting said sheet holder and said type carriage laterally in opposite directions.

5. In a machine for printing time records upon workmen's identification sheets, a sheet holder, a type carriage, a single means for simultaneously shifting said sheet holder and said type carriage to effect relative movement therebetween, and means for locking said sheet holder and said type carriage in any one of a number of adjusted positions independently of said shifting means.

6. In a machine for printing time records upon workmen's identification sheets, a sheet holder element, a type carriage element, means interconnecting said elements for simultaneously shifting said elements laterally in opposite directions, and means independent of said inter-connecting means for locking said elements together to hold them in any one of a number of predetermined positions.

7. In a machine for printing time records upon workmen's identification cards in a plurality of horizontally spaced vertical columns, a card holder element and a type element, means comprising mechanical linkage between said elements for simultaneously shifting said elements laterally in opposite directions to select the column in which the imprint is to be made, and means for directly interlocking said card holder element and said type element independently of said linking means to insure the exact positioning of the imprint in the selected column.

8. In a card recorder for printing time records upon workmen's identification cards inserted therein, a vertical card lift mechanism comprising card supporting means carried by a movable pivoted arm, a ratchet member pivoted co-axially with said arm and movable therewith, an actuating pawl and a retaining pawl for controlling movement of said ratchet member, and means controlled by said actuating pawl for throwing said retaining pawl out of engagement with said ratchet member.

9. In a card recorder for printing time records upon workmen's identification cards inserted therein, a vertical card lift mechanism comprising card supporting means carried by a movable arm, a ratchet member for controlling said arm, an actuating pawl and a retaining pawl for said ratchet member, and means effective only in a predetermined position of said card supporting means for simultaneously throwing said two pawls out of engagement with said ratchet member, said means including a stop on said ratchet member for disengaging said actuating pawl and a member carried by said actuating pawl for disengaging said retaining pawl.

10. In a machine for printing upon workmen's identification sheets inserted therein the time of their insertion, a spring pressed, pivotally mounted hammer member, means for withdrawing said hammer member against the spring action and releasing it comprising a pivotally mounted arm non-coaxial with said hammer member, a dog pivotally mounted on said arm and engaging said hammer to withdraw it, and means biasing said dog toward engagement with said hammer member, said dog and arm being movable as a unit to release the hammer member, said dog having an arcuate portion for engaging the hammer member, said arcuate portion having its center substantially at the pivotal axis of the dog.

ALBERT E. LONG.